(12) United States Patent
Shaikh (10) Patent No.: US 9,392,000 B2
(45) Date of Patent: Jul. 12, 2016

(54) RE-AUTHENTICATION TIMER FOR USER EQUIPMENT

(75) Inventor: Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 137 days.

(21) Appl. No.: 13/233,124

(22) Filed: Sep. 15, 2011

(65) Prior Publication Data
US 2013/0074149 A1   Mar. 21, 2013

(51) Int. Cl.
*G06F 7/04* (2006.01)
*G06F 15/16* (2006.01)
*G06F 17/30* (2006.01)
*H04L 29/06* (2006.01)
*H04W 12/06* (2009.01)

(52) U.S. Cl.
CPC ............. *H04L 63/108* (2013.01); *H04W 12/06* (2013.01)

(58) Field of Classification Search
CPC ........................ H04L 61/3075; H04L 65/1066
See application file for complete search history.

(56) References Cited

U.S. PATENT DOCUMENTS

| | | | |
|---|---|---|---|
| 6,334,056 B1* | 12/2001 | Holmes et al. | 455/445 |
| 6,859,651 B2* | 2/2005 | Gabor | 455/411 |
| 7,342,906 B1* | 3/2008 | Calhoun | 370/338 |
| 7,454,615 B2* | 11/2008 | O'Neil et al. | 713/168 |
| 2004/0185848 A1* | 9/2004 | Phan-Anh et al. | 455/435.1 |
| 2009/0116440 A1* | 5/2009 | Zhao et al. | 370/329 |

OTHER PUBLICATIONS

Mark Grayson; Kevin Shatzkamer; Klaas Wierenga; "Building the Mobile Internet"; Jan. 24, 2011; Cissco Press; Chapter 3. Nomandicity. Authentication and Authorization; http://my.safaribooksonline.com/book/networking/network-management/9780131390539/nomadicity/ch03lev1sec1.*
3GPP TS 23.401, "3GPP_TS23401_990.pdf", General Packet Radio Service (GPRS) enhancements for Evolved Universal Terrestrial Radio Access Network (E-UTRAN) access, Jun. 2011, Version 9.9.0, http://www.3gpp.org/ftp/Specs/html-info/23401.htm.*

* cited by examiner

*Primary Examiner* — Andrew Nalven
*Assistant Examiner* — Quy Pham

(57) ABSTRACT

A device receives, from a user equipment (UE), a first request to access a first packet data network (PDN), and receives authentication information from the UE. The device also grants, based on the first request, the UE access to the first PDN when the authentication information authenticates the UE. The device further receives, from the UE, a second request to access a second PDN, and determines whether a re-authentication timer associated with the second PDN has expired before granting the UE access to the second PDN.

18 Claims, 7 Drawing Sheets

| Subscriber ID | PDN ID | Re-authentication Timer |
|---|---|---|
| UE1 | PDN1 | 1 – 10 minutes |
| UE1 | PDN2 | 30 seconds |
| UE1 | PDN3 | 1 – 2 hours |
| UE2 | PDN1 | 45 minutes |
| UE2 | PDN2 | 15 – 40 seconds |
| *** | *** | *** |

FIG. 5

| Subscriber ID | PDN ID | Re-authentication Timer |
|---|---|---|
| UE1 | PDN1 | 1 – 10 minutes |
| UE1 | PDN2 | 30 seconds |
| UE1 | PDN3 | 1 – 2 hours |
| UE2 | PDN1 | 45 minutes |
| UE2 | PDN2 | 15 – 40 seconds |
| *** | *** | *** |

RE-AUTHENTICATION TIMER FOR USER EQUIPMENT

BACKGROUND

A fourth generation (4G) wireless network is an all Internet protocol (IP) wireless network in which different advanced multimedia application services (e.g., voice over IP (VoIP) content, video content, etc.) are delivered over IP. 4G wireless networks include a radio access network, such as, for example, a long term evolution (LTE) network or an enhanced high rate packet data (eHRPD) network. 4G wireless networks also include an IP multimedia subsystem (IMS) network and a wireless core network, referred to as an evolved packet core (EPC) network. The LTE network is often called an evolved universal terrestrial radio access network (E-UTRAN). The EPC network is an all-IP packet-switched core network that supports high-speed wireless and wireline broadband access technologies. An evolved packet system (EPS) is defined to include the LTE (or eHRPD) network and the EPC network.

Two components of the EPS are a home subscriber server (HSS) and a mobility management entity (MME). The HSS is provided in the IMS network and includes a database where user equipment (UE) subscriber profile information is stored. The MME is provided in the EPC network and is responsible for handling control plane signaling with UEs as the UEs are provided access to different packet data networks (PDNs).

DETAILED DESCRIPTION OF PREFERRED EMBODIMENTS

The following detailed description refers to the accompanying drawings. The same reference numbers in different drawings may identify the same or similar elements.

Systems and/or methods described herein may provide a re-authentication timer that specifies a period of time after which a UE may need to re-authenticate in order to access one or more PDNs. In one example implementation, a MME of an EPS network may receive, from a UE, a first request to access a first PDN, and may receive authentication information from the UE. The MME may grant the UE access to the first PDN based on the first request and/or the authentication information, and may receive, from the UE, a second request to access a second PDN. The MME may determine whether a re-authentication timer associated with the second PDN is expired. If the re-authentication timer is not expired, the MME may grant the UE access to the second PDN based on the second request. If the re-authentication timer is expired, the MME may request re-authentication information from the UE, and may determine whether the UE is re-authenticated based on the re-authentication information. If the UE is re-authenticated, the MME may grant the UE access to the second PDN based on the second request and/or the re-authentication information. If the UE is not re-authenticated, the MME may deny the UE access to the second PDN.

As used herein, the terms "subscriber" and/or "user" may be used interchangeably. Also, the terms "subscriber" and/or "user" are intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
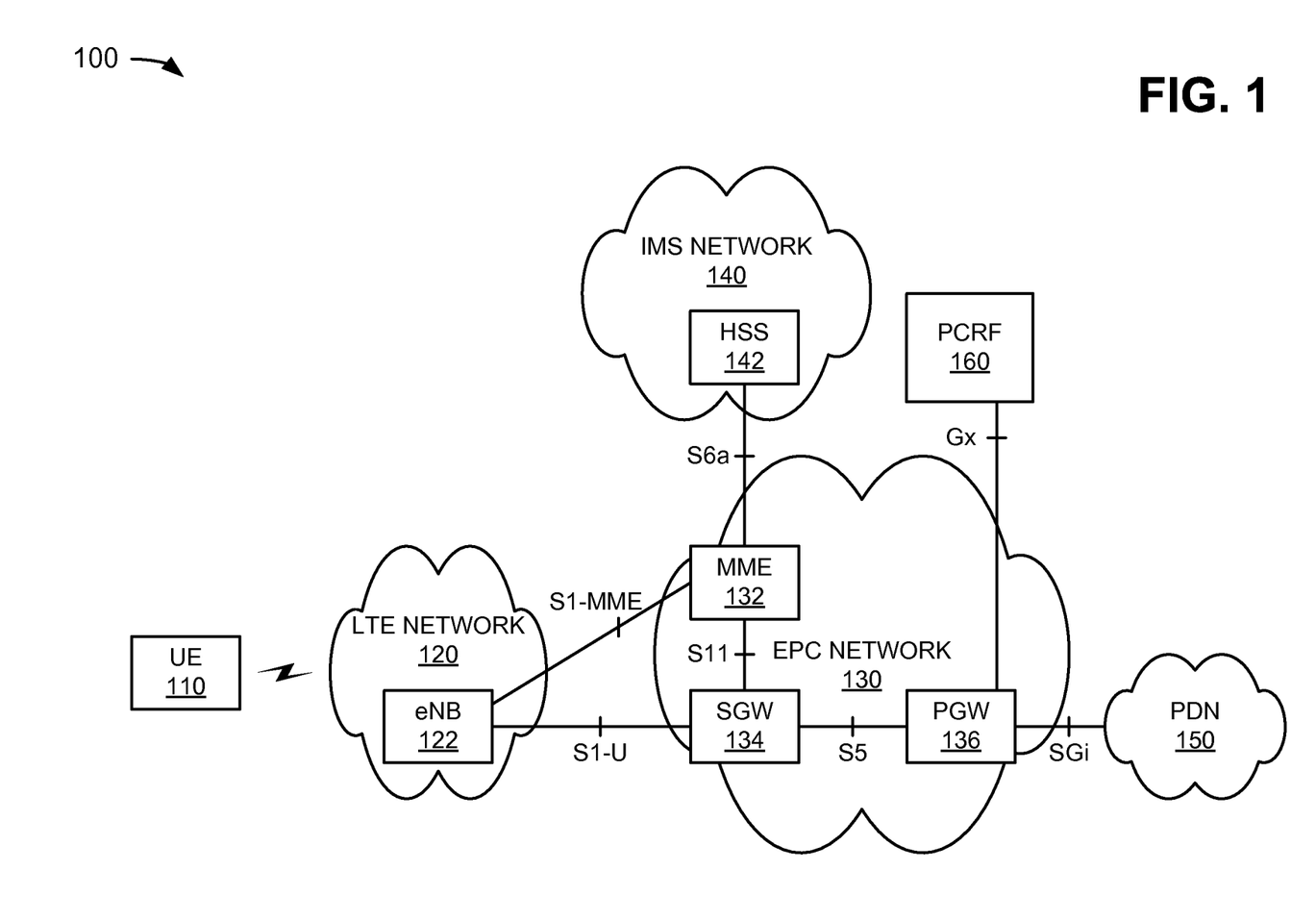
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110, a LTE network 120, an EPC network 130, an IMS network 140, a PDN 150, and a policy and charging rules function (PCRF) 160. LTE network 120 may include a base station or an eNodeB (eNB) 122. EPC network 130 may include a MME 132, a serving gateway (SGW) 134, and a PDN gateway (PGW) 136. IMS network 140 may include a HSS 142. Devices and/or networks of network 100 may interconnect via wired and/or wireless connections.

A single UE 110, LTE network 120, eNB 122, EPC network 130, MME 132, SGW 134, PGW 136, IMS network 140, HSS 142, PDN 150, and PCRF 160 have been illustrated in FIG. 1 for simplicity. In practice, there may be more UEs 110, LTE networks 120, eNBs 122, EPC networks 130, MMEs 132, SGWs 134, PGWs 136, IMS networks 140, HSSs 142, PDNs 150, and/or PCRFs 160. As further shown in FIG. 1, eNB 122 may interface with MME 132 over a S1-MME interface, and may interface with SGW 134 over a S1-U interface. MME 132 may interface with SGW 134 over a S11 interface, and may interface with HSS 142 over a S6a interface. SGW 134 may interface with PGW 136 over a S5 interface. PGW 136 may interface with PDN 150 over a SGi interface, and may interface with PCRF 160 over a Gx interface.

UE 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a wireless air card), or other types of computation or communication devices. In one example, UE 110 may include a device that is capable of communicating over LTE network 120, EPC network 130, IMS network 140, and/or PDN 150.

LTE network 120 may include a communications network that connects subscribers (e.g., UEs 110) to a service provider. In one example, LTE network 120 may include a WiFi network (e.g., using IEEE 802.11 standards) or other access networks (e.g., an E-UTRAN or an eHRPD network). In another example, LTE network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and wirelessly transmit that voice and/or data to UE 110. eNB 122 may also include one or more devices that wirelessly receive voice and/or data from UE 110 and transmit that voice and/or data to one of MME 132 and/or SGW 134 or to other UEs 110. eNB 122 may combine the functionalities of a base station and a radio network controller (RNC) in 2G or 3G radio access networks.

EPC network 130 may include a core network architecture of the Third Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110) and may choose a SGW for UE 110 at an initial attach and at a time of intra-LTE handover. MME 132 may authenticate UE 110 via interaction with HSS 142. Non-access stratum (NAS) signaling may terminate at MME 132 and MME 132 may generate and allocate temporary identities to UEs 110. MME 132 may check authorization of UE 110 to camp on a service provider's Public Land Mobile Network (PLMN) and may enforce roaming restrictions for UE 110. MME 132 may be a termination point in EPC network 130 for ciphering/integrity protection for NAS signaling and may handle security key management. MME 132 may provide a control plane function for mobility between LTE and access networks.

In one example implementation, MME 132 may receive, from UE 110, a first request to access a first PDN (e.g., PDN 150), and may receive authentication information from UE 110. MME 132 may grant UE 110 access to the first PDN based on the first request and/or the authentication information, and may receive, from UE 110, a second request to access a second PDN (e.g., a PDN other than PDN 150). MME 132 may determine whether a re-authentication timer corresponding to the second PDN is expired. If the re-authentication timer is not expired, MME 132 may grant UE 110 access to the second PDN based on the second request. If the re-authentication timer is expired, MME 132 may request re-authentication information from UE 110, and may determine whether UE 110 is re-authenticated based on the re-authentication information. If UE 110 is re-authenticated, MME 132 may grant UE 110 access to the second PDN based on the second request and/or the re-authentication information. If UE 110 is not re-authenticated, MME 132 may deny UE 110 access to the second PDN.

SGW 134 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 134 may route and forward user data packets, may act as a mobility anchor for a user plane during inter-eNB handovers, and may act as an anchor for mobility between LTE and other 3GPP technologies. For an idle state UE 110, SGW 134 may terminate a downlink (DL) data path and may trigger paging when DL traffic arrives for UE 110. SGW 134 may manage and store contexts associated with UE 110 (e.g., parameters of an IP bearer service, network internal routing information, etc.).

PGW 136 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 136 may provide connectivity of UE 110 to external PDNs (e.g., PDN 150) by being a traffic exit/entry point for UE 110. UE 110 may simultaneously connect to more than one PGW 136 for accessing multiple PDNs 150. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services.

HSS 142 may include one or more computation or communication devices that gather, process, search, and/or provide information in a manner described herein. In one example implementation, HSS 142 may include a master user database that supports devices of IMS network 140 that handle calls. HSS 142 may include subscription-related information (e.g., subscriber profiles), may perform authentication and authorization of a user, and may provide information about a subscriber's location and IP information.

In one example implementation, HSS 142 may receive (e.g., from an operator of HSS 142) re-authentication timers for each PDN associated with UE 110, and may store the re-authentication timers in a database provided in or associated with HSS 142. The re-authentication timers may specify periods of time after which UE 110 may need to re-authenticate in order to access one or more PDNs. HSS 142 may receive (e.g., from the operator) a change to a particular re-authentication timer stored in the database, and may update the database to include the change to the particular re-authentication timer. HSS 142 may provide the re-authentication timers to MME 132, and MME 132 may grant, to UE 110, access to a particular PDN when the re-authentication timer for the particular PDN has not expired.

PDN 150 may include one or more networks, such as a local area network (LAN), a wide area network (WAN), a metropolitan area network (MAN), a telephone network, the Internet, etc., capable of communicating with UE 110. In one example PDN 150 may include a network that breaks up a message (e.g., information) into packets for transmission. Unlike a circuit switching network, which requires establishment of a dedicated point-to-point connection, each packet in PDN 150 may include a destination address. Thus, packets in a single message may not travel the same path. As traffic conditions change in PDN 150, the packets may be dynamically routed via different paths in PDN 150, and the packets may even arrive out of order. A destination device in PDN 150 may reassemble the packets into their proper sequence. In one example implementation, PDN 150 may include multiple PDNs, such as a first PDN 150-1, a second PDN 150-2, etc., which may be accessed by UE 110.

PCRF 160 may include one or more server devices, or other types of computation or communication devices, that gather, process, and/or provide information in a manner described herein. For example, PCRF 160 may include a device that provides policy control decision and flow based charging control functionalities. PCRF 160 may provide network control regarding service data flow detection, gating, quality of service (QoS) and flow based charging, etc. PCRF 160 may determine how a certain service data flow shall be treated, and may ensure that user plane traffic mapping and treatment is in accordance with a user's subscription profile.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
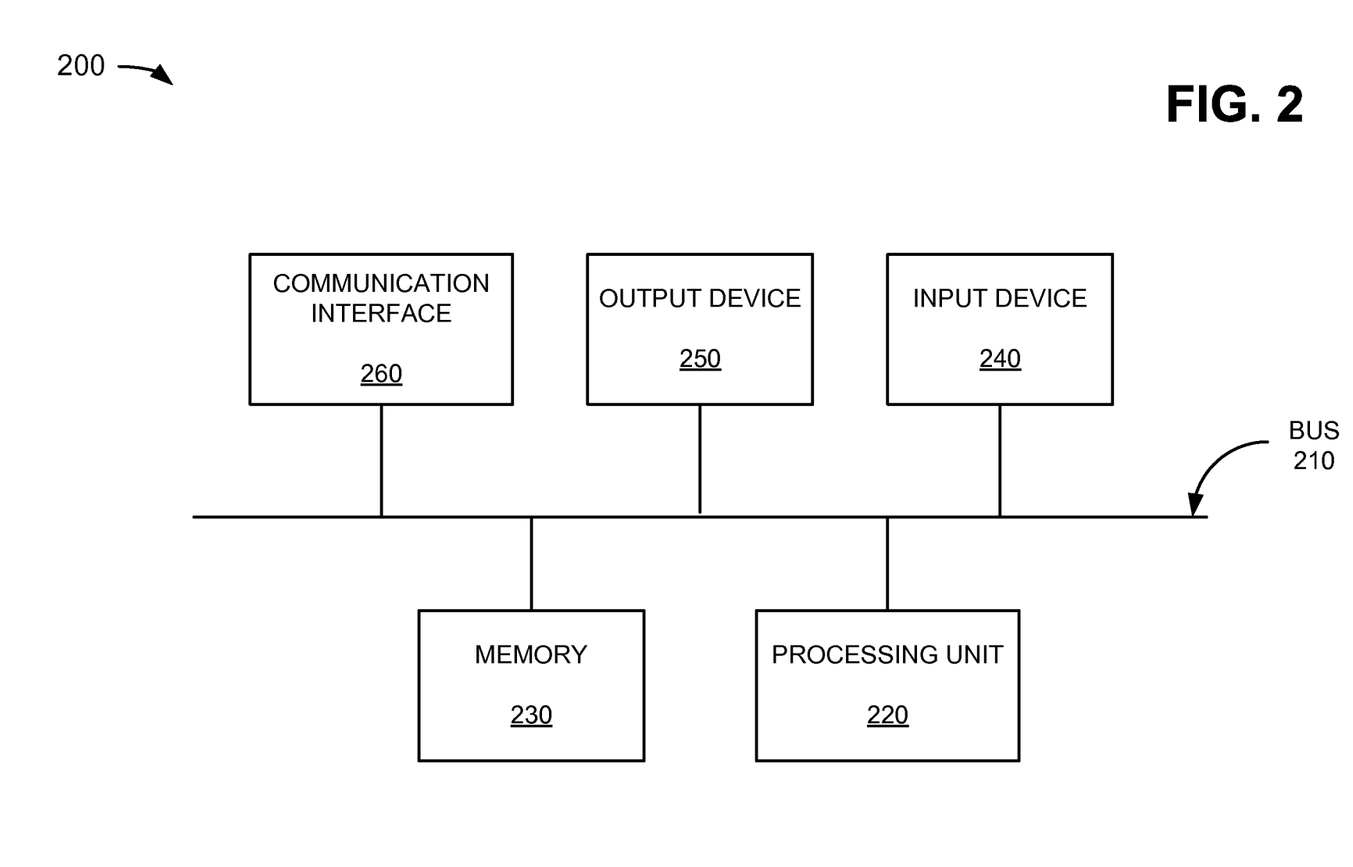
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
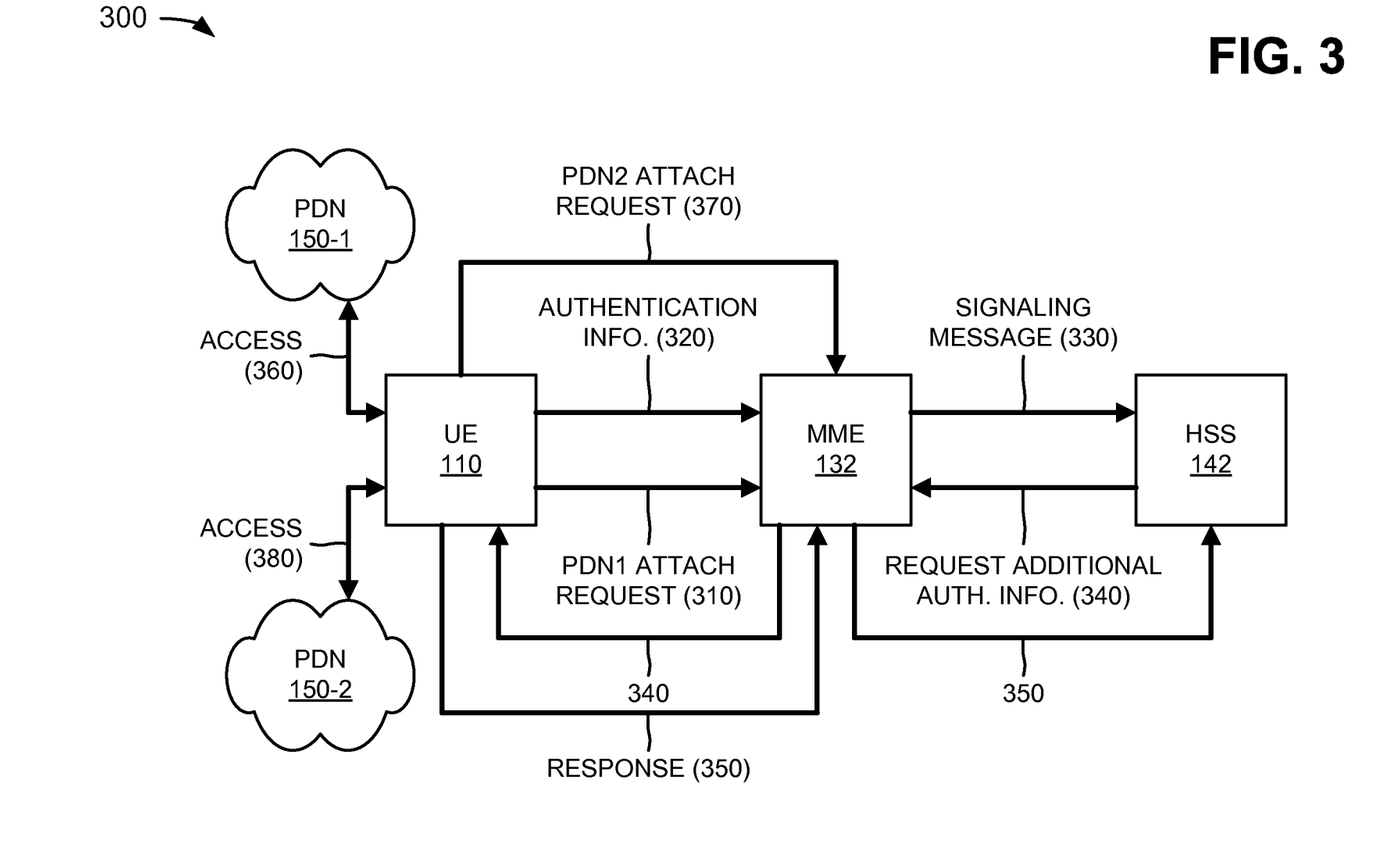
FIG. 3 is a diagram of example operations capable of being performed by an example portion of the network in FIG. 1.

FIG. 3 is a diagram of example operations capable of being performed by an example portion of network 100 (FIG. 1). As shown in FIG. 3, network portion 300 may include UE 110, MME 132, HSS 142, first PDN 150-1, and second PDN 150-2. UE 110, MME 132, HSS 142, first PDN 150-1, and second PDN 150-2 may include the features described above in connection with, for example, one or more of FIGS. 1 and 2.

As further shown in FIG. 3, UE 110 may provide, to MME 132, a request 310 to attach to first PDN 150-1, and may provide authentication information 320 to MME 132. Authentication information 320 may include credentials associated with UE 110, such as a mobile directory number (MDN), a mobile identification number (MIN), a mobile equipment identity (MEID), an international mobile equipment identity (IMEI), an International Mobile Subscriber Identity (IMSI), etc. associated with UE 110. MME 132 may receive request 310 and authentication information 320. MME 132 may authorize UE 110 to access HSS 142 of IMS network 140 (not shown) based on authentication information 320. For example, MME 132 may use the IMSI of UE 110, as an identity for UE 110, when sending a signaling message 330 to HSS 142. Signaling message 330 may include the IMSI of UE 110 and may be received by HSS 142 via the S6a interface. Upon receiving signaling message 330, HSS 142 may request additional authentication information from UE 110, via MME 110, as indicated by reference number 340. In one example, HSS 142 may request additional authentication information from UE 110 using an EPS authentication and key agreement (AKA) mechanism as defined by 3GPP standard specifications.

A number of signaling message 330 exchanges may take place between UE 110 and HSS 142, via MME 132. For example, HSS 142 may provide, to MME 132, a request 340 for additional authentication information associated with UE 110. MME 132 may receive request 340, and may provide request 340 to UE 110. UE 110 may generate a response 350 to request 340, and may provide response 350 to MME 132. Response 350 may include the additional authentication information associated with UE 110. MME 132 may provide response 350 to HSS 142. If MME 132 and/or HSS 142 determine (e.g., based on authentication information 320 and response 350) that UE 110 has the appropriate authentication credentials, MME 132 and/or HSS 142 may authenticate UE 110 and may grant UE 110 access to first PDN 150-1, as indicted by reference number 360. During the authentication process, HSS 142 may provide MME 132 information regarding the PDNs that UE 110 is permitted to access.

Once UE 110 is attached to first PDN 150-1, the authentication process for UE 110 is not repeated for subsequent UE 110 attachments to PDNs since MME 132 stores the information regarding the PDNs that UE 110 is permitted to access. For example, as shown in FIG. 3, after accessing first PDN 150-1, UE 110 may provide, to MME 132, a request 370 to attach to second PDN 150-2. MME 132 and/or HSS 142 may not repeat the authentication process for UE 110, based on request 370, but rather may grant UE 110 access to second PDN 150-1, as indicted by reference number 380.

By not repeating the authentication process for UE 110, transactions between MME 132 and HSS 142 may be reduced and subsequent PDN connection requests by UE 110 may be serviced more quickly. However, not repeating the authentication process may create security problems when UE 110 is stolen, lost, and/or possessed by someone other than a paying subscriber. The stolen, lost, or improperly possessed UE 110 may provide the possessor with access to all of the PDNs subscribed to by UE 110. For example, as long as UE 110 is powered on, the authenticated UE 110 may provide the possessor with access to PDNs 150-1 and 150-2, without being forced to re-authenticate UE 110. This may pose a security problem, especially when the possessor intends to harm a network, such as PDN 150.

Although FIG. 3 show example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
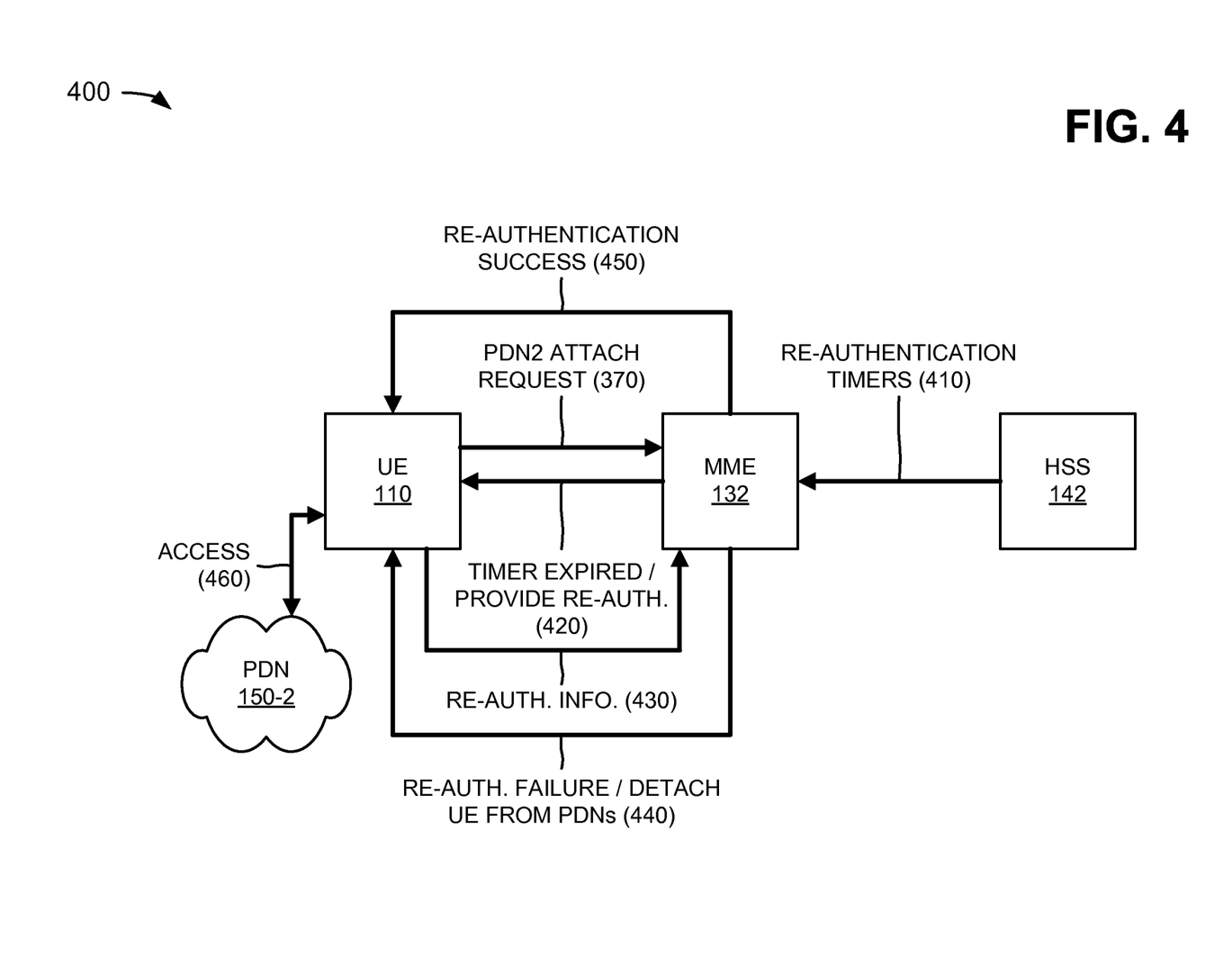
FIG. 4 is a diagram of example operations capable of being performed by another example portion of the network in FIG. 1.

FIG. 4 is a diagram of example operations capable of being performed by another example portion 400 of network 100 (FIG. 4). As shown in FIG. 4, network portion 300 may include UE 110, MME 132, HSS 142, and second PDN 150-2. UE 110, MME 132, HSS 142, and second PDN 150-2 may include the features described above in connection with, for example, one or more of FIGS. 1-3. In one example implementation, FIG. 4 may depict operations that may enable UE 110 to be re-authenticated before being permitted to access additional PDNs. Such operations may prevent the security problems noted above with respect to FIG. 3.

As further shown in FIG. 4, HSS 142 may provide re-authentication timers 410 to MME 132. Re-authentication timers 410 may be input to HSS 142 by an operator of HSS 142, and may specify a period of time after which UE 110 may need to re-authenticate in order to access one or more PDNs, such as second PDN 150-2. Re-authentication timers 410 may be stored in a database associated with or provided in HSS 142, and may be provided in a subscriber profile associated with UE 110, which may also be stored in the database. Each re-authentication timer 410 may be specified for each PDN to which UE 110 has access, may be operator configurable, and may have a range of values that may be altered by the operator. For example, the operator of HSS 142 may set each re-authentication timer 410 to be different for each type of PDN based on how much UE 110 may be a security threat to different PDNs. Alternatively, or additionally, the operator of HSS 142 may specify different re-authentication timers 410 for two UEs that have access to the same PDN.

In one example, when UE 110 is successfully authenticated by MME 132 (e.g., as described above in connection with FIG. 3), HSS 142 may provide, to MME 132, re-authentication timers 410 that are customized for UE 110. Subsequently, UE 110 may provide, to MME 132, request 370 to attach to second PDN 150-2. However, rather than automatically granting UE 110 access to second PDN 150-2, as described above in connection with FIG. 3, MME 132 may determine whether a re-authentication timer 410 corresponding to second PDN 150-2 is expired. If the re-authentication timer is not expired, MME 132 may grant UE 110 access to second PDN 150-2 based on request 370. If the re-authentication timer is expired, MME 132 may request re-authentication information from UE 110, as indicated by reference number 420. Based on the request for re-authentication information, UE 110 may provide re-authentication information 430 to MME 132. For example, the request for re-authentication information may include a request for a login and a password from a user of UE 110, and re-authentication information 430 may include a login and a password input by the user of UE 110.

MME 132 may receive re-authentication information 430, and may determine whether UE 110 is re-authenticated based on re-authentication information 430. For example, MME 132 may determine whether the user-inputted login and password are correct for UE 110. If re-authentication information 430 is incorrect (e.g., the login and/or password are incorrect) and re-authentication of UE 110 for second PDN 150-2 fails, MME 132 may deny UE 110 access to second PDN 150-2 by detaching UE 110 from second PDN 150-2 using a MME 132 initiated PDN disconnect, as indicated by reference number 440. In one example implementation, if any PDN re-authentication fails, re-authentication timers 410, for all other PDNs to which UE 110 is attached, may expire and may prompt the user of UE 110 to re-authenticate UE 110 for the other PDNs as well.

As further shown in FIG. 4, if re-authentication information 430 is correct (e.g., the login and password are correct), MME 132 may re-authenticate UE 110 for accessing second PDN 150-2, as indicated by reference number 450. When UE 110 is re-authenticated, MME 132 may grant UE 110 access to second PDN 150-2 based on request 370 and/or re-authentication information 430, as indicated by reference number 460.

Although FIG. 4 show example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

Figure 5:
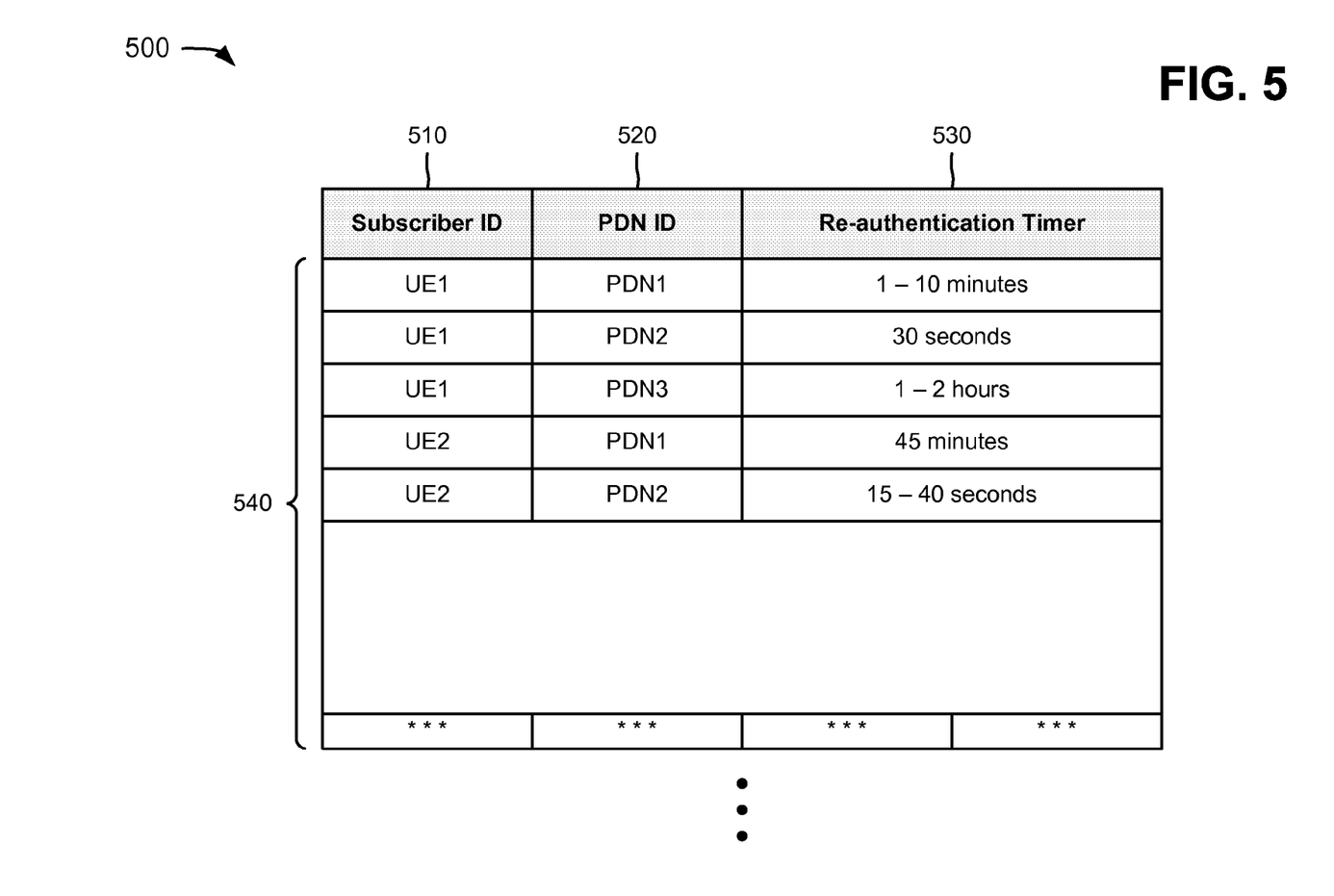
FIG. 5 is a diagram of a portion of an example database capable of being provided in and/or managed by a HSS of FIG. 1.

FIG. 5 is a diagram of a portion 500 of an example database capable of being provided in and/or managed by HSS 142. As illustrated, database portion 500 may include a variety of information associated with a subscriber profile, such as subscriber information, PDN information, and re-authentication timers information. For example, database portion 700 may include a subscriber identification (ID) field 510, a PDN ID field 520, a re-authentication timer field 530, and/or a variety of entries 540 associated with fields 510-530.

Subscriber ID field 510 may include information associated with users (e.g., of user device 110), such as subscriber identifications, subscriber names, subscriber addresses, subscriber account information, a UE identifier (e.g., an IMSI), etc. For example, subscriber ID field 510 may include identifiers for a first UE (e.g., "UE1"), a second UE (e.g., "UE2"), etc.

PDN ID field 520 may include identification information for PDNs that may be accessed by the UEs identified in subscriber ID field 510. For example, PDN ID field 520 may include address information associated with the PDNs that may be accessed by the UEs. As shown in FIG. 5, the first UE (e.g., "UE1") may have access to a first PDN (e.g., "PDN1"), a second PDN (e.g., "PDN2"), and a third PDN (e.g., "PDN3"). The second UE (e.g., "UE2") may have access to the first PDN (e.g., "PDN1") and the second PDN (e.g., "PDN2").

Each entry in re-authentication timer field 530 may specify a period of time after which a UE (e.g., identified in subscriber ID field 510) may need to re-authenticate in order to access one or more PDNs. Each entry in re-authentication timer field 530 may be specified for each PDN to which a UE has access. Re-authentication timer field 530 may be operator configurable, and may have a range of values that may be altered by the operator. For example, an operator of HSS 142 may set one or more entries in re-authentication timer field 530 to be different for each type of PDN based on how much a UE may be a security threat to different PDNs. Alternatively, or additionally, the operator of HSS 142 may specify different entries in re-authentication timer field 530 for two UEs that have access to the same PDN.

As shown in FIG. 5, the first UE (e.g., "UE1") may have a re-authentication timer of 1-10 minutes for the first PDN (e.g., "PDN1"), may have a re-authentication timer of 30 seconds for the second PDN (e.g., "PDN2"), and may have a re-authentication timer of 1-2 hours for the third PDN (e.g., "PDN3"). Assuming the first UE is authenticated for and accesses the first PDN, the first UE may access the second PDN within 30 seconds of accessing the first PDN without having to be re-authenticated. However, after the 30 second time period expires, the first UE may need to be re-authenticated before the first UE may access the second PDN. As further shown in FIG. 5, the second UE (e.g., "UE2") may have a re-authentication timer of 45 minutes for the first PDN (e.g., "PDN1"), and may have a re-authentication timer of 15-40 seconds for the second PDN (e.g., "PDN2"). Assuming the second UE is authenticated for and accesses the first PDN, the second UE may access the second PDN within a range of 15-40 seconds after accessing the first PDN without having to be re-authenticated. However, if the second UE attempts to access the second PDN outside of the 15-40 seconds range, the second UE may need to be re-authenticated before the second UE may access the second PDN.

Although FIG. 5 shows example information that may be provided in database portion 500, in other implementations, database portion 500 may contain less information, different information, differently arranged information, and/or additional information than depicted in FIG. 5.

Figure 6:
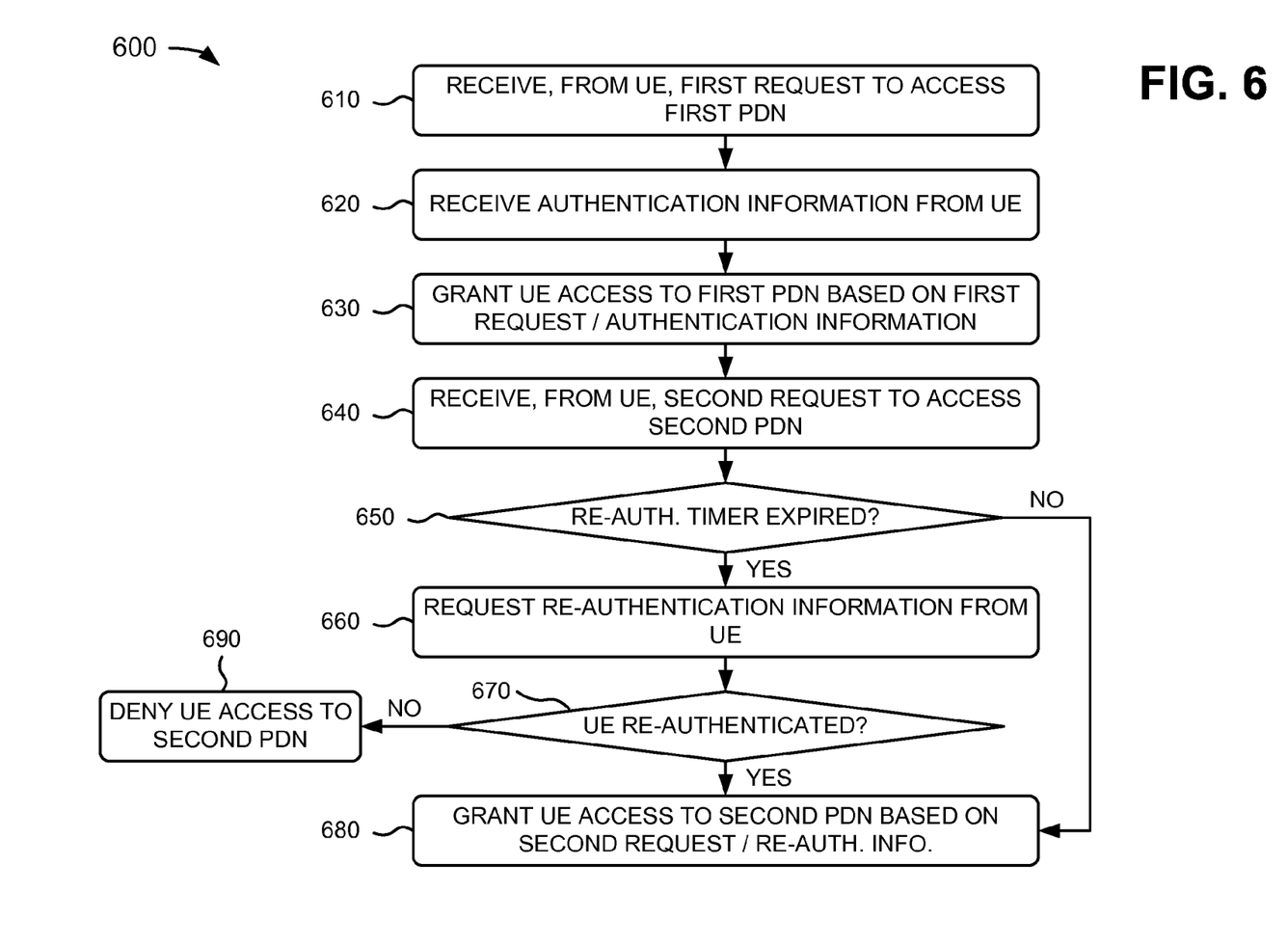
FIG. 6 is a flow chart of an example process for re-authenticating a UE for access to a PDN according to an implementation described herein.

FIG. 6 is a flow chart of an example process 600 for re-authenticating a UE for access to a PDN according to an implementation described herein. In one implementation, process 600 may be performed by MME 132. Alternatively, or additionally, some or all of process 600 may be performed by another device or group of devices, including or excluding MME 132.

As shown in FIG. 6, process 600 may include receiving, from a UE, a first request to access a first PDN (block 610), and receiving authentication information from the UE (block 620). For example, in an implementation described above in connection with FIG. 3, UE 110 may provide, to MME 132, request 310 to attach to first PDN 150-1, and may provide authentication information 320 to MME 132. Authentication information 320 may include credentials associated with UE 110, such as an IMSI associated with UE 110. MME 132 may receive request 310 and authentication information 320.

As further shown in FIG. 6, process 600 may include granting the UE access to the first PDN based on the first request and/or the authentication information (block 630), and receiving, from the UE, a second request to access a second PDN (block 640). For example, in an implementation described above in connection with FIG. 3, if MME 132 and/or HSS 142 determine (e.g., based on authentication information 320 and response 350) that UE 110 has the appropriate authentication credentials, MME 132 and/or HSS 142 may authenticate UE 110 and may grant UE 110 access to first PDN 150-1, as indicted by reference number 360. After accessing first PDN 150-1, UE 110 may provide, to MME 132, a request 370 to attach to second PDN 150-2.

Returning to FIG. 6, process 600 may include determining whether a re-authentication timer, for accessing the second PDN, has expired (block 650). If the re-authentication timer has not expired (block 650—NO), process 600 may include granting the UE access to the second PDN based on the second request (block 680). For example, in an implementation described above in connection with FIG. 4, MME 132 may determine whether a re-authentication timer 410 corresponding to second PDN 150-2 is expired. If the re-authentication timer is not expired, MME 132 may grant UE 110 access to second PDN 150-2 based on request 370.

As further shown in FIG. 6, if the re-authentication timer has expired (block 650—YES), process 600 may include requesting re-authentication information from the UE (block 660), and determining whether the UE is re-authenticated for accessing the second PDN (block 670). If the UE is re-authenticated (block 670—YES), process 600 may include granting the UE access to the second PDN based on the second request and the re-authentication information (block 680). If the UE is not re-authenticated (block 670—NO), process 600 may include denying the UE access to the second PDN (block 690). For example, in an implementation described above in connection with FIG. 4, if the re-authentication timer is expired, MME 132 may request re-authentication information from UE 110, and UE 110 may provide re-authentication information 430 to MME 132. MME 132 may receive re-authentication information 430, and may determine whether UE 110 is re-authenticated based on re-authentication information 430. If re-authentication of UE 110 for second PDN 150-2 fails, MME 132 may detach UE 110 from second PDN 150-2 using a MME 132 initiated PDN disconnect, as indicated by reference number 440. If re-authentication information 430 is correct (e.g., the login and password are correct), MME 132 may re-authenticate UE 110 for accessing second PDN 150-2. When UE 110 is re-authenticated, MME 132 may grant UE 110 access to second PDN 150-2 based on request 370 and/or re-authentication information 430.

Figure 7:
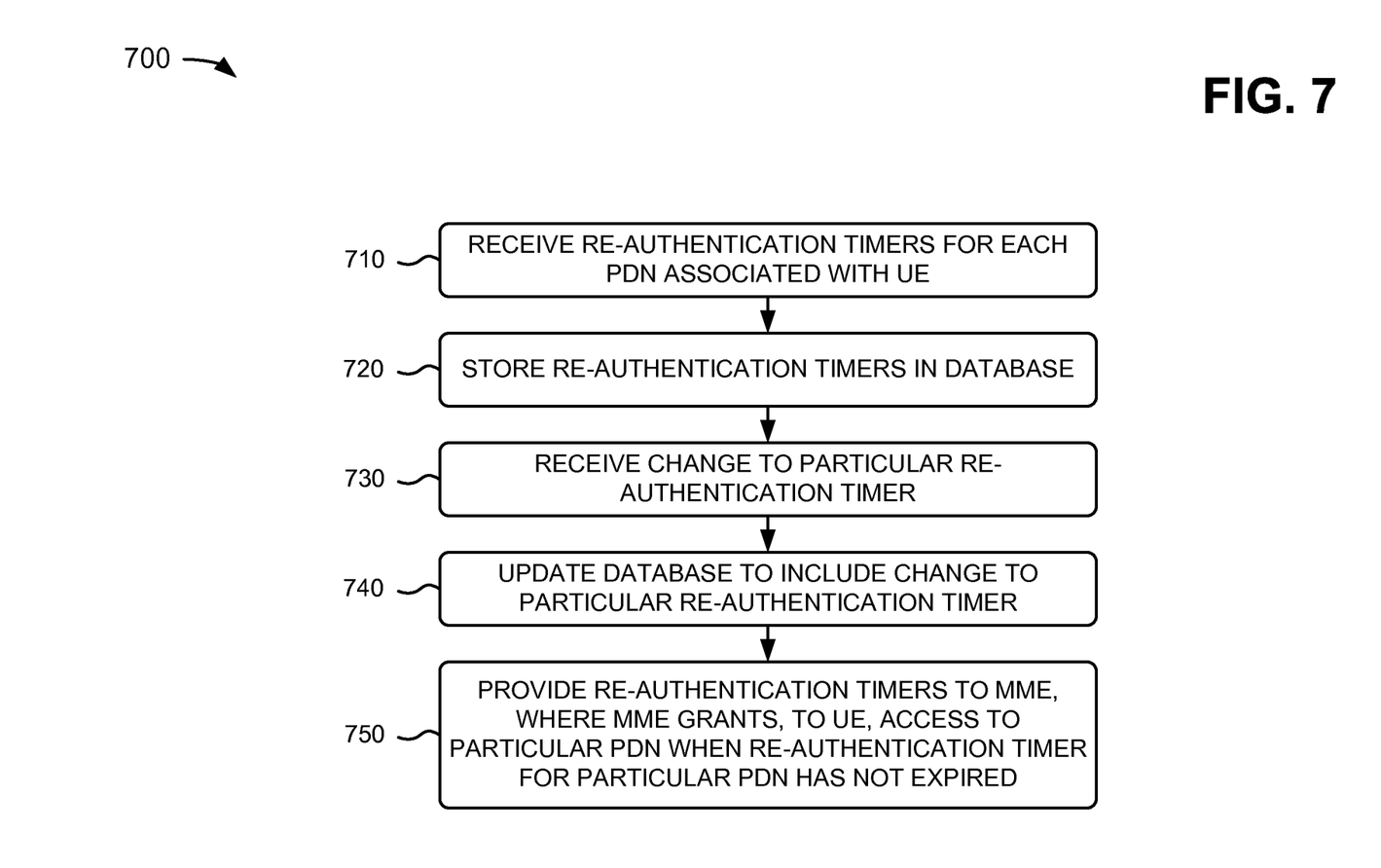
FIG. 7 is a flow chart of another example process for storing, updating, and utilizing UE re-authentication timers according to an implementation described herein.

FIG. 7 is a flow chart of another example process 700 for storing, updating, and utilizing UE re-authentication timers according to an implementation described herein. In one implementation, process 700 may be performed by HSS 142. Alternatively, or additionally, some or all of process 700 may be performed by another device or group of devices, including or excluding HSS 142.

As shown in FIG. 7, process 700 may include receiving re-authentication timers for each PDN associated with a UE (block 710), and storing the re-authentication timers in a database (block 720). For example, in an implementation described above in connection with FIG. 4, re-authentication timers 410 may be input to HSS 142, and may specify a period of time after which UE 110 may need to re-authenticate in order to access one or more PDNs, such as second PDN 150-2. Re-authentication timers 410 may be stored in a database associated with or provided in HSS 142, and may be provided in a subscriber profile associated with UE 110, which may also be stored in the database. Each re-authentication timer 410 may be specified for each PDN to which UE 110 has access, may be operator configurable, and may have a range of values that may be altered by the operator.

As further shown in FIG. 7, process 700 may include receiving a change to a particular re-authentication timer (block 730), and updating the database to include the change to the particular re-authentication timer (block 740). For example, in an implementation described above in connection with FIG. 4, an operator of HSS 142 may set each re-authentication timer 410 to be different for each type of PDN based on how much UE 110 may be a security threat to different PDNs. Alternatively, or additionally, the operator of HSS 142 may specify different re-authentication timers 410 for two UEs that have access to the same PDN.

Returning to FIG. 7, process 700 may include providing the re-authentication timers to a MME, where the MME grants, to the UE, access to a particular PDN when the re-authentication timer for the particular PDN has not expired (block 750). For example, in an implementation described above in connection with FIG. 4, when UE 110 is successfully authenticated by MME 132 (e.g., as described above in connection with FIG. 3), HSS 142 may provide, to MME 132, re-authentication timers 410 that are customized for UE 110. Subsequently, UE 110 may provide, to MME 132, request 370 to attach to second PDN 150-2. However, rather than automatically granting UE 110 access to second PDN 150-2, MME 132 may determine whether a re-authentication timer 410 corresponding to second PDN 150-2 is expired. If the re-authentication timer is not expired, MME 132 may grant UE 110 access to second PDN 150-2 based on request 370.

Systems and/or methods described herein may provide a re-authentication timer that specifies a period of time after which a UE may need to re-authenticate in order to access one or more PDNs.

Furthermore, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device and from a user equipment (UE), a first request to access a first packet data network (PDN);
   receiving, by the computing device and from the UE, authentication information for accessing the first PDN;
   granting, by the computing device, the UE first access to the first PDN based on the first request and the authentication information;
   receiving, by the computing device and from the UE, a second request to access a second PDN;
   determining, by the computing device, whether a re-authentication timer associated with the second PDN has expired before granting the UE second access to the second PDN based on the second request after granting the UE the first access to the first PDN, wherein the re-authentication timer is not associated with the first PDN;
   without receiving, from the UE, re-authentication information for accessing the second PDN, granting the UE the second access to the second PDN, based on the second request, in response to determining that the re-authentication timer has not expired before granting the UE second access to the second PDN based on the second request after granting the UE the first access to the first PDN; and
   receiving a plurality of re-authentication timers associated with PDNs that are accessible to the UE,
   wherein the re-authentication timer is included in the plurality of re-authentication timers.

2. The method of claim 1, further comprising:
   requesting the re-authentication information from the UE when the re-authentication timer has expired; and
   determining whether the UE is re-authenticated to access the second PDN based on the re-authentication information.

3. The method of claim 2, further comprising:
   granting, based on the second request, the UE the second access to the second PDN when the UE is re-authenticated; and
   denying the UE the second access to the second PDN when the UE is not re-authenticated.

4. The method of claim 2, where the re-authentication information includes a login and password input by a user of the UE.

5. The method of claim 1, where the authentication information includes at least one of:
   a mobile directory number (MDN) associated with the UE,
   a mobile identification number (MIN) associated with the UE,
   a mobile equipment identity (MEID) associated with the UE,
   an international mobile equipment identity (IMEI) associated with the UE, or
   an International Mobile Subscriber Identity (IMSI) associated with the UE.

6. A method, comprising:
   receiving, by a computing device, re-authentication timers, each for each packet data network (PDN) associated with a user equipment (UE) where at least two re-authentication timers among the re-authentication timers are different from each other;
   storing, by the computing device, the re-authentication timers in a database; and
   providing, by the computing device, the re-authentication timers to a mobility management entity (MME) device,
   where each re-authentication timer is set to expire at an end of a period of time after which the UE needs to be re-authenticated to access a corresponding PDN, and
   where the MME device grants the UE access to a particular PDN when a re-authentication timer for the particular PDN has not expired.

7. The method of claim 6, further comprising:
   receiving a change to a particular re-authentication timer; and
   updating the database to include the change to the particular re-authentication timer.

8. The method of claim 6, where the period of time is determined according to a security threat of the UE to a corresponding PDN.

9. A device, comprising:
   a processor to:
      receive, from a user equipment (UE), a first request to access a first packet data network (PDN), receive authentication information for accessing the first PDN from the UE, grant, based on the first request, the UE first access to the first PDN when the UE is authenticated based on authentication information, receive, from the UE, a second request to access a second PDN, determine whether a re-authentication timer associated with the second PDN has expired before granting the UE second access to the second PDN based on the second request after granting the UE the first access to the first PDN, wherein the re-authentication timer is not associated with the first PDN, without receiving, from the UE, re-authentication information for accessing the second PDN, grant the UE the second access to the second PDN, based on the second request, when the re-authentication timer has not expired in response to determining that the re-authentication timer has not expired before granting the UE second access to the second PDN based on the second request after granting the UE the first access to the first PDN, and receive a plurality of re-authentication timers associated with PDNs that are accessible to the UE, wherein the re-authentication timer is included in the plurality of re-authentication timers.

10. The device of claim 9, where the processor is further to:
request the re-authentication information from the UE when the re-authentication timer has expired, and
determine whether the UE is re-authenticated to access the second PDN based on the re-authentication information.

11. The device of claim 10, where the processor is further to:
grant, based on the second request, the UE the second access to the second PDN when the UE is re-authenticated, and
deny the UE the second access to the second PDN when the UE is not re-authenticated.

12. The device of claim 10, where the re-authentication information includes a login and password input by a user of the UE.

13. The device of claim 9, where the authentication information includes at least one of:
a mobile directory number (MDN) associated with the UE,
a mobile identification number (MIN) associated with the UE,
a mobile equipment identity (MEID) associated with the UE,
an international mobile equipment identity (IMEI) associated with the UE, or
an International Mobile Subscriber Identity (IMSI) associated with the UE.

14. The device of claim 9, where the device includes a mobility management entity (MME) device.

15. A device, comprising:
a processor to:
receive re-authentication timers, each for each packet data network (PDN) associated with a user equipment (UE) where at least two re-authentication timers among the re-authentication timers are different from each other,
store the re-authentication timers in a database, and
provide the re-authentication timers to a mobility management entity (MME) device,
where each re-authentication timer is set to expire at an end of a period of time, after which the UE needs to be re-authenticated to access a corresponding PDN, and
where the MME device grants the UE access to a particular PDN when a re-authentication timer for the particular PDN has not expired.

16. The device of claim 15, where the processor is further to:
receive a change to a particular re-authentication timer, and
update the database to include the change to the particular re-authentication timer.

17. The device of claim 15, where the period of time is determined according to a security threat of the UE to a corresponding PDN.

18. The device of claim 15, where the device includes a home subscriber server (HSS) device.

* * * * *